United States Patent
Fink et al.

[15] 3,652,137
[45] Mar. 28, 1972

[54] ANTISKID CONTROL CIRCUIT

[72] Inventors: Werner Fink, Frankfurt am Main; Erwin Schlitz, Heusenstamm; Gunther Werner, Oberstedten, all of Germany

[73] Assignee: International Telephone and Telegraph Corporation, New York, N.Y.

[22] Filed: Feb. 25, 1970

[21] Appl. No.: 14,110

[30] Foreign Application Priority Data

Mar. 1, 1969 Germany..................P 19 10 599.8

[52] U.S. Cl......................303/21 CG, 188/181 A, 324/162, 340/262
[51] Int. Cl. ..............................................B60t 8/12
[58] Field of Search...............188/181; 303/20, 21; 307/121; 318/617; 324/162; 340/52, 262

[56] References Cited

UNITED STATES PATENTS

| 3,026,148 | 3/1962 | Ruof | 303/21 CG |
| 3,034,836 | 5/1962 | Ruof | 303/21 EB |
| 2,927,302 | 3/1960 | Steigerwald | 303/21 A |
| 3,015,767 | 1/1962 | Taylor | 318/617 |

Primary Examiner—Milton Buchler
Assistant Examiner—Stephen G. Kunin
Attorney—C. Cornell Remsen, Jr., Walter J. Baum and Paul W. Hemminger

[57] ABSTRACT

In this antiskid control of the type in which a DC signal proportional to wheel speed is filtered and differentiated in an RC-circuit to obtain an acceleration signal free of undesirable harmonics, diodes or other semi-conductors having a fixed forward voltage are connected in opposite forward direction in parallel to the resistance of the filter so that an acceleration signal bypasses the resistance and is conducted to the discriminator without significant time delay when the forward voltage of the diodes is exceeded.

7 Claims, 4 Drawing Figures

Inventors
Werner Fink
Erwin Schlitz
Gunther Werner

ANTISKID CONTROL CIRCUIT

BACKGROUND OF THE INVENTION

This invention relates to antiskid brake systems for vehicles and particularly to an electric control circuit for such systems having a voltage generator as a speed indicator followed by a filtering element and a differentiating circuit to generate a control signal which is a function of the wheel acceleration and deceleration.

Since the slip which occurs at the wheels of a vehicle when the vehicle is fully braked is the result of an excessive rate of wheel deceleration, antiskid devices often utilize the wheel deceleration as the control quantity. A measured variable proportional to the wheel deceleration is recorded at the input of a control unit and starts a controlling action when it exceeds a predetermined value, thus effecting a reduction of brake pressure. When the reacceleration of the wheel has reached a value predetermined in the control unit, the brake pressure increases and a new control cycle may start. When the brake pressure is reapplied, the wheel would have accelerated almost to the instantaneous speed of the vehicle.

Although the acceleration and deceleration of the wheel can be measured in different ways, this invention relates to a method in which an electric signal is produced which is proportional to the deceleration or acceleration. This can be achieved by differentiating, by means of an RC-circuit, the output voltage of a speed indicator provided for the wheel, such as a d.c. generator rotating with the wheel.

Since the terminal voltage of a d.c. generator is subject to considerable interference by upper harmonics due to the commutation of the collector carbon brushes, and these harmonics represent an undesirable disturbing voltage for the medium d.c. voltage, it is necessary to filter the generator voltage in an RC-circuit or an LC-circuit. If the unfiltered voltage of the generator were to be conducted directly to the differentiating circuit, the disturbing voltage would also be differentiated and the output voltage of this RC-circuit would be also interfered with by upper harmonics so that the following threshold discriminator would often respond to disturbing voltages instead of real deceleration. On the other hand, the filtering of the d.c. voltage involves the disadvantage that the signal indicating the deceleration is registered in the discriminator only after a delay due to the high time constant $T = RC$ which is always characteristic for the integrating circuit so that the slip of the wheel, that is, the difference between vehicle speed and wheel speed, which appears as a result of an excessive deceleration, continues to increase before a control cycle begins.

SUMMARY OF THE INVENTION

The object of the invention is to provide an electric control circuit for an antiskid system in which the deceleration and acceleration signal is obtained with the shortest possible time delay in spite of the filter applied between the voltage generator and the differentiating circuit.

The present invention achieves this by connecting diodes or other semiconductors with opposite forward direction and a certain forward voltage in parallel to the resistance or the choke of the filter. Preferably the amount of the forward voltage equals half the disturbing voltage.

DESCRIPTION OF THE PREFERRED EMBODIMENT

Figure 1:
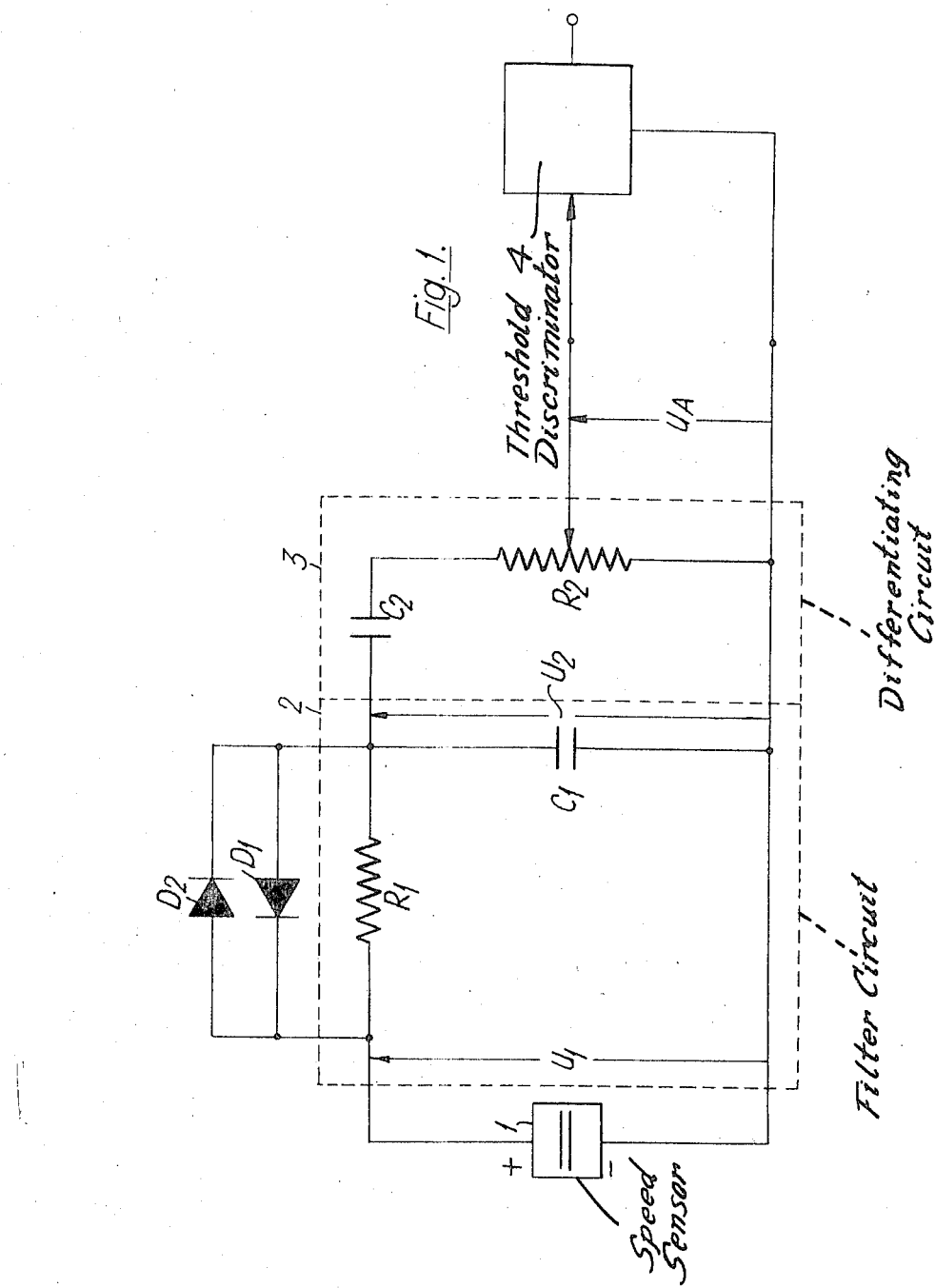
FIG. 1 is a schematic representation of an electric circuit for the generation of a voltage signal proportional to the deceleration or acceleration embodying the present invention.

Referring to FIG. 1 there is shown a speed sensor 1, in the form of a voltage generator which is followed by an integrating or low pass filter circuit 2 comprising the resistance $R_1$ and the capacitor $C_1$ in which the voltage $U_1$ generated by the speed sensor and interfered with by upper harmonics is filtered. The output voltage of the integrating circuit 2, i.e., the voltage of the charging capacitor $C_1$, is $U_2$. This filtered voltage is conducted to a differentiating circuit 3 which comprises the capacitor $C_2$ and the resistance $R_2$. From the resistance $R_2$ the voltage $U_4$ which is proportional to the deceleration or acceleration is conducted to the threshold discriminator 4 which causes the control unit to respond to a certain input voltage. In order to reduce the time constant of the voltage course of the capacitor $C_1$ in case of a deceleration or acceleration, the resistance $R_1$ is bypassed by two diodes $D_1$ and $D_2$ connected antiparallelly, that is, in reverse parallel direction. The diodes become highly conductive in the one and the other direction respectively at a certain voltage difference across the resistance $R_1$.

Figure 2:
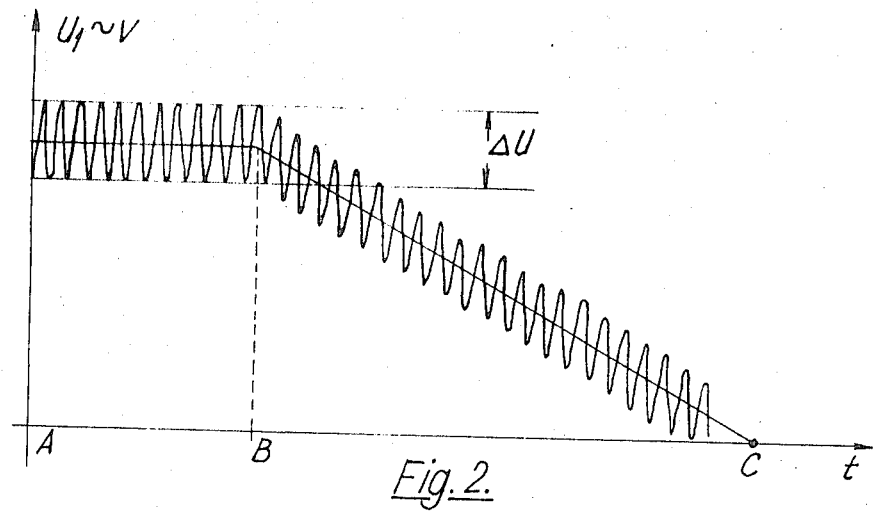
FIG. 2 is a curve showing the unfiltered generator voltage which corresponds to the wheel speed as a function of time.
Figure 3:
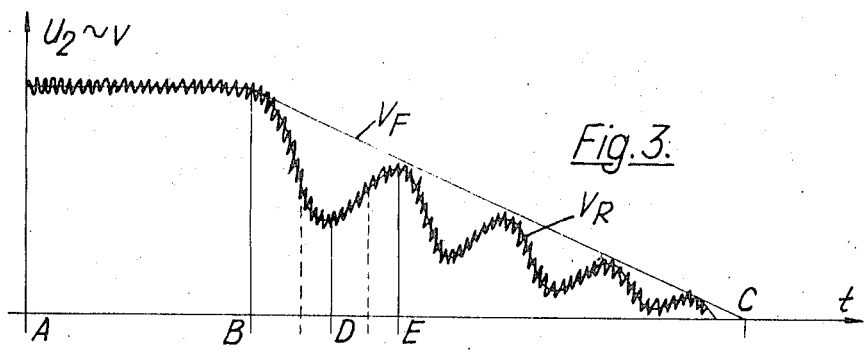
FIG. 3 is a curve showing the output voltage of the filter, corresponding to the wheel speed, during the control action, for the circuit of FIG. 1.
Figure 4:
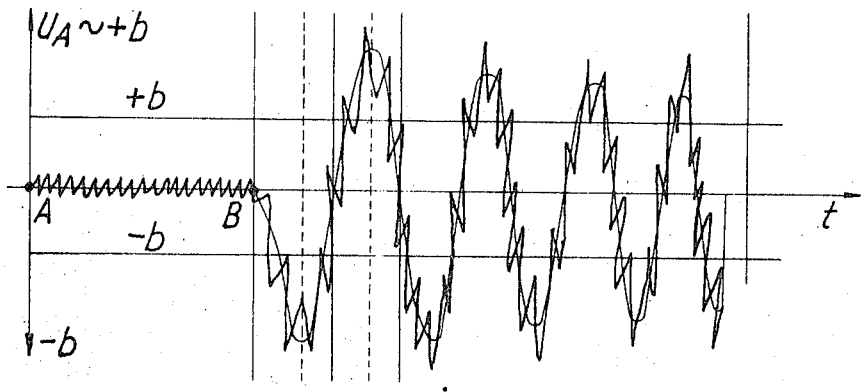
FIG. 4 is a curve showing the output voltage, corresponding to the rotary deceleration or acceleration, of the sensor shown in FIG. 1.

During unbraked driving conditions which correspond to the course of the curve between the points A and B in FIGS. 2, 3 and 4, the difference between the generator voltage $U_1$ and the filtered voltage $U_2$ is insignificant so that the forward voltage of the diodes across the resistance $R_1$ is not reached. Hence, the generator voltage is filtered normally so that only slight disturbing voltage appears in the differentiating circuit and the discriminator is not caused to respond incorrectly to voltage peaks.

During a braking action corresponding to the course of the curve between B and C in FIGS. 2 and 3 the voltage in the generator decreases. Since the charge of the capacitor $C_1$ has to be changed through the resistance and this is subject to a time constant $T = RR_1C_1$, a voltage drop $U_2-U_1$ is produced across the resistance $R_1$ which finally reaches the forward voltage of the one diode $D_1$. The resistance $R_1$ is then bypassed in one direction by the slight resistance of the diode so that the capacitor $C_1$ is quickly discharged through the diode $D_1$ and the internal resistance of the voltage generator. Therefore, the voltage change is conducted to the differentiating circuit 3 without significant delay and a rapid differentiation through $C_2R_2$ is possible. The deceleration reaches its threshold value which actuates the pressure control and causes a reacceleration of the wheel by reducing the brake pressure. Simultaneously, the generator voltage increases and the capacitor is quickly recharged in opposite direction through the diode $D_2$ so that the signal for increasing the brake pressure is conducted to the control unit with very little delay. The wheel speed during the repeated control action results in an undulated curve as shown in FIG. 3.

During the bypassing of the resistance $R_1$ by one of the diodes the output voltage $U_A$ of the differentiating circuit 3 is interfered with by a higher disturbing voltage. However, due to the inclination of the acceleration curve in this range (See FIG. 4) its influence on the course of the control is negligible.

The forward voltage of the diodes should approximately equal the value $\frac{1}{2}\Delta U$, $\Delta U$ being the disturbing voltage of the unfiltered generator voltage. Consequently, it is characteristic for the filter 2 bypassed by the diodes to filter with a high time constant within a range of disturbing amplitudes $\Delta U$ and, thus, to eliminate control actions initiated by disturbing voltage peaks, but to enable a quick discharge and recharge of the capacitor $C_1$ through the diodes with a low time constant and also a quick differentiation when the voltage difference between the input and output of the filter exceeds the value $\Delta U$, i.e., at high acceleration or deceleration.

This invention provides a control unit which responds sensitively to actual voltage variations, while eliminating the influence of the disturbing voltage on the course of the control.

It will be appreciated that the invention illustrated and described herein may be modified by those skilled in the art without deviating from the spirit and scope of the invention as set forth in the following claims.

WE CLAIM AS OUR INVENTION:

1. An acceleration and deceleration sensor for antiskid devices in vehicles comprising:
   a voltage generator producing an output voltage proportional to wheel speed and having superimposed thereon interfering upper harmonics of said output voltage;
   a filter circuit including a first capacitor and a two terminal non-capacitive component, one terminal of said non-capacitive component being directly connected to said generator and said first capacitor being directly connected between the other terminal of said non-capacitive component and a reference voltage;
   a differentiating circuit including a second capacitor and a resistive component coupled in series with respect to each other and in parallel with respect to said first capacitor to provide across at least a portion of said resistive component acceleration and deceleration signals; and
   a pair of semi-conductor devices having opposite forward directions directly connected in parallel with respect to each other and said parallel connected devices are directly connected in parallel with only said non-capacitive component;
   said non-capacitive component having developed thereacross a predetermined forward bias voltage for said pair of devices, each of said devices being rendered conductive when its said predetermined bias voltage is exceeded to conduct said output voltage from said generator to said differentiating circuit without significant time delay and without significant effect on said acceleration and deceleration signals by said intefering harmonics.

2. The sensor according to claim 1, wherein said devices are semi-conductor diodes.

3. The sensor according to claim 2, wherein said predetermined bias voltage equals one half of the amplitude of said interfering harmonics.

4. The sensor according to claim 2, wherein said non-capacitive component is a resistor, and said diodes are directly connected in parallel to each other and said parallel connected diodes are directly connected in parallel with only said resistor.

5. The sensor according to claim 4, wherein
   said predetermined bias voltage equals one half of the amplitude of said interfering harmonics.

6. The sensor according to claim 4, wherein
   said resistive component is a potentiometer having a movable terminal, and
   said acceleration and deceleration signals are present at said movable terminal.

7. The sensor according to claim 6, further including a threshold discriminator coupled to said movable terminal to produce antiskid control signals.

* * * * *